US012691841B2

(12) United States Patent　　　(10) Patent No.:　　US 12,691,841 B2
Tatarinov　　　　　　　　　　　　(45) Date of Patent:　　Jul. 28, 2026

(54) BUMPER ASSEMBLY WITH CRASH BOXES

(71) Applicant: AUDI AG, Ingolstadt (DE)

(72) Inventor: Konstantin Tatarinov, Bielefeld (DE)

(73) Assignee: AUDI AG, Ingolstadt (DE)

( * ) Notice: Subject to any disclaimer, the term of this patent is extended or adjusted under 35 U.S.C. 154(b) by 294 days.

(21) Appl. No.: 18/199,033

(22) Filed: May 18, 2023

(65) Prior Publication Data

US 2023/0373419 A1　　Nov. 23, 2023

(30) Foreign Application Priority Data

May 19, 2022　(DE) ..................... 10 2022 112 618.8

(51) Int. Cl.
　B60R 19/34　　　(2006.01)
　B60R 19/18　　　(2006.01)
(52) U.S. Cl.
　CPC .............. B60R 19/34 (2013.01); B60R 19/18 (2013.01)
(58) Field of Classification Search
　CPC .......... B60R 19/18; B60R 19/34; B60R 19/02
　See application file for complete search history.

(56) References Cited

U.S. PATENT DOCUMENTS

| | | | |
|---|---|---|---|
| 2006/0066115 A1 | 3/2006 | Haneda et al. | |
| 2006/0290149 A1 | 12/2006 | Roll et al. | |
| 2006/0290150 A1 | 12/2006 | Roll et al. | |
| 2008/0116719 A1* | 5/2008 | Bae ......................... | B60R 19/34 |
| | | | 296/187.09 |
| 2010/0237639 A1* | 9/2010 | Handing ................. | B60R 19/03 |
| | | | 29/458 |
| 2022/0009435 A1 | 1/2022 | Guenther | |

FOREIGN PATENT DOCUMENTS

| | | | | |
|---|---|---|---|---|
| CN | 113195310 A | 7/2021 | | |
| DE | 102004041476 A1 | 11/2005 | | |
| DE | 102005029726 A1 | 1/2007 | | |
| DE | 102008017055 A1 | 10/2009 | | |
| DE | 102009013322 A1 | 9/2010 | | |
| DE | 102012012901 A1 | 11/2012 | | |
| DE | 102011113823 A1 | 3/2013 | | |
| DE | 102013015420 A1 | 4/2015 | | |
| DE | 102015105625 A1 | 10/2016 | | |
| EP | 1736369 A2 | 12/2006 | | |
| WO | WO-2014083926 A1 * | 6/2014 | ............ | B60R 19/34 |
| WO | 2015/145835 A1 | 10/2015 | | |

OTHER PUBLICATIONS

Kaneko et al., WIP Patent No. WO 2014083926 A1, English Translation dated Jul. 16, 2025. (Year: 2014).*
Office Action for German Application No. 10 2022 112 618.8 mailed Feb. 27, 2023; 97pp.
Office Action in CN Application No. 202310552598.4, mailed Mar. 19, 2026, 18pp.
Office Action in DE Application No. 102022112618.8, mailed Feb. 3, 2026, 14pp.

* cited by examiner

*Primary Examiner* — Caroline N Butcher
(74) *Attorney, Agent, or Firm* — HAUPTMAN HAM, LLP

(57) ABSTRACT

A bumper assembly, having a cross member, which is coupled to a motor vehicle via crash boxes, wherein the cross member is oriented with its longitudinal direction in the motor vehicle transverse direction and on a rear wall has attachment regions in which the crash boxes are coupled by a material connection to the cross member, wherein in cross section a chamfer or a radius is configured on the crash boxes in an external corner, relative to the motor vehicle transverse direction.

15 Claims, 3 Drawing Sheets

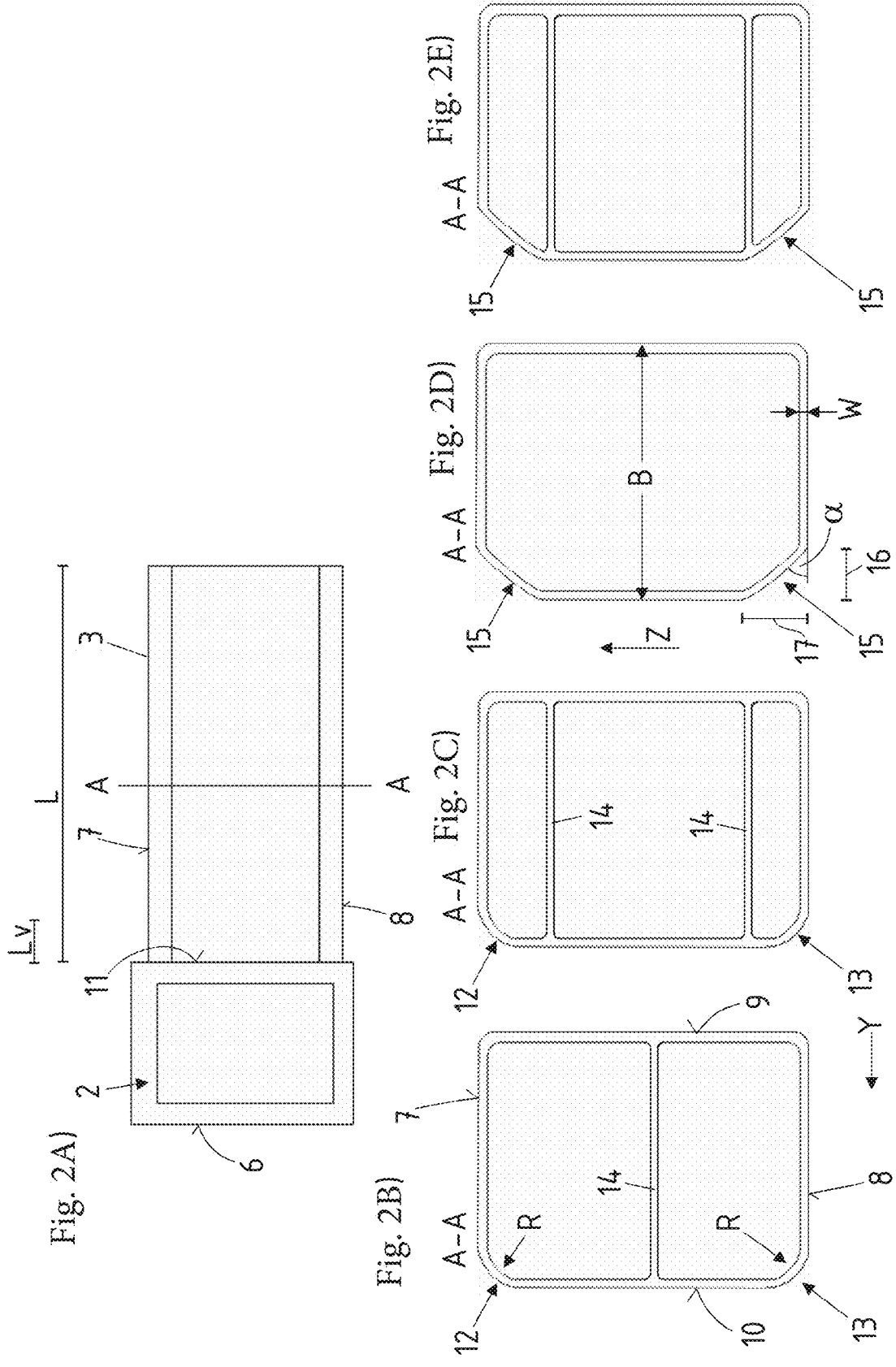

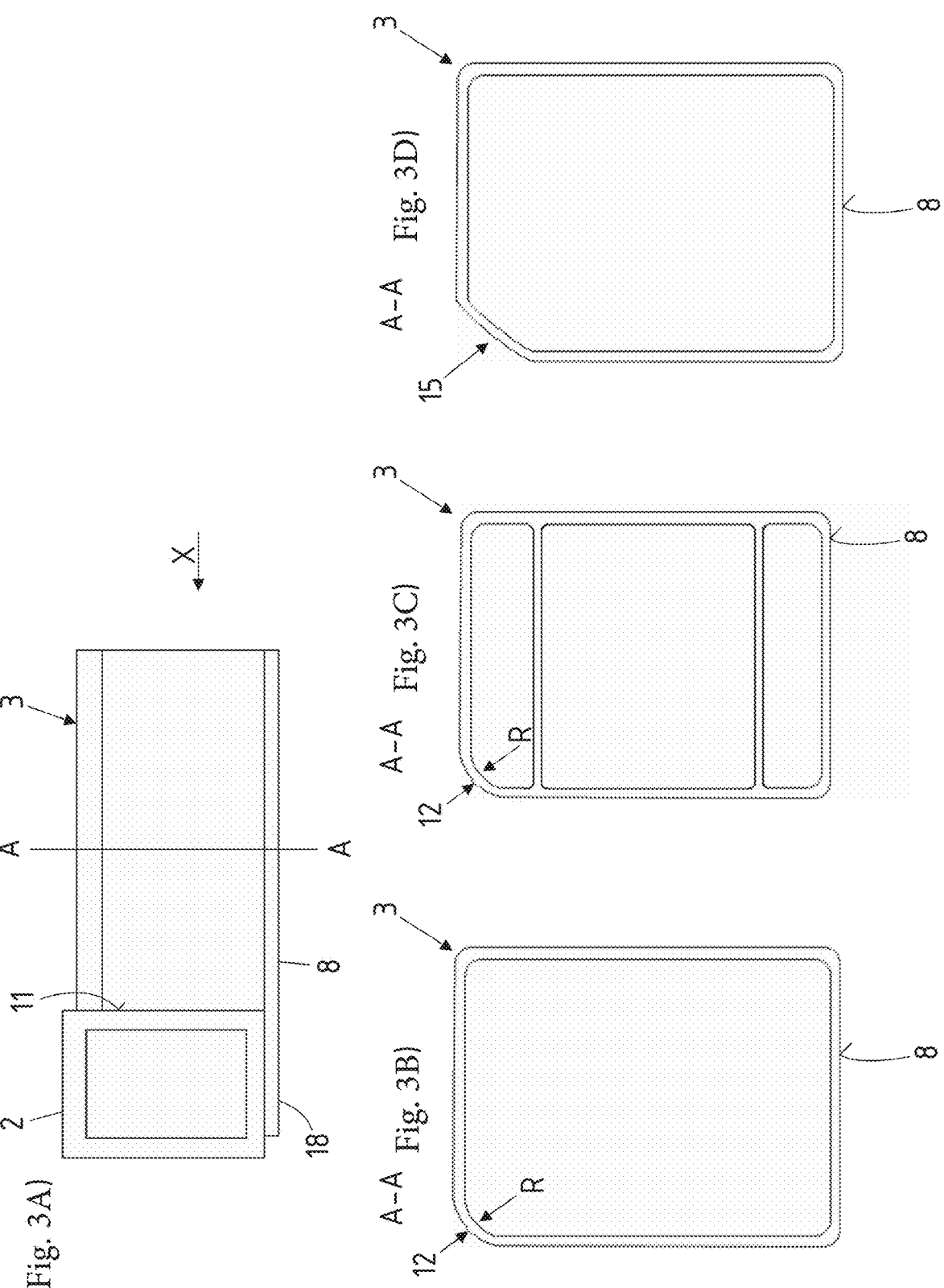

BUMPER ASSEMBLY WITH CRASH BOXES

RELATED APPLICATIONS

The present application claims priority to German Application Number 10 2022 112 618.8 filed May 19, 2022, the disclosure of which is hereby incorporated by reference herein in its entirety.

FIELD

The present disclosure relates to a bumper assembly having a cross member which is coupled to a motor vehicle via crash boxes.

BACKGROUND

Bumper assemblies are arranged on the front side or end side on a motor vehicle. These bumper assemblies serve for converting crash energy into deformation work in the event of an impact of the motor vehicle on an object.

Such bumper assemblies have a cross member which substantially extends in the motor vehicle transverse direction and has a width which substantially corresponds to the motor vehicle itself or is slightly smaller. Such a cross member is connected via crash boxes to the motor vehicle. In the case of a front bumper assembly, the crash boxes are arranged on the front side on longitudinal members. The transverse member and the crash boxes are generally components which are produced separately from one another and which are joined together. Screw connections or welded connections are known as the most common variants.

A problem occurs in the event of an impact, such as a central impact, since a central impact is able to result in the joint between the cross member and the crash boxes being broken off, such as when the cross member itself is also deformed into itself, for example due to a post as described, for example, in WO 2015 145 835 A1.

SUMMARY

An object of the present disclosure is to provide a bumper assembly which increases the crash performance in a bumper assembly mentioned in the introduction and, such as in the event of a crash, prevents the cross member from being broken off from the crash boxes.

The aforementioned object is achieved according to the disclosure in a bumper assembly.

The bumper assembly according to at least one embodiment of the disclosure has a cross member which is coupled to a motor vehicle via crash boxes. The cross member itself extends with its longitudinal direction in the motor vehicle transverse direction or is oriented in this motor vehicle transverse direction. The cross member is able to have a bent or curved path. The cross member also has attachment regions in the region of a rear wall or even directly on the rear wall. The crash boxes are coupled by a material connection to the cross member in the attachment regions and this is carried out, such as, by a welding process.

The cross member, but also the crash boxes, are able to be produced from metallic materials, such as from a light metal alloy. The crash boxes and the cross member are extruded components.

According to at least one embodiment of the disclosure, the bumper assembly is characterized in that in cross section a chamfer or a radius is configured on the crash boxes in an external corner relative to the motor vehicle transverse direction. The crash box is configured, for example, as a component which is rectangular or square in cross section. The crash box thus has an upper wall, a lower wall and two side walls. Relative to the motor vehicle transverse direction in each case one side wall of a crash box is internal and one side wall is external. According to at least one embodiment of the disclosure, in cross section the corner between the upper wall and the external side wall or between the lower wall and the external side wall is thus configured as a chamfer or radius. For example, a weld seam which connects the crash box and the cross member is configured to pass or run continuously over the corner or chamfer or radius. Relative to the cross section of the crash box, this referred to as a corner. The corner would then correspond to the edge over the entire longitudinal path of the crash box. Thus instead of the word "corner", the region also is able to be denoted as the "edge". The edge is thus configured in cross section as a chamfer or radius, at least over some longitudinal portions. In at least one embodiment of the disclosure, however, the chamfer or the radius runs over the entire longitudinal path of the edge.

According to at least one embodiment of the disclosure, due to the chamfer or the radius, in the event of a crash, such as in a post test, the occurring stresses are not concentrated in the corner itself but due to the radius or the chamfer are distributed over a larger longitudinal region. The initial welding quality is also able to improved, since there is no 90° directional change in a welding process, as might be the case in an angled corner, but an improved weld seam quality is able to be generated throughout due to the chamfer or the radius. This also increases the performance of the bumper assembly according to the disclosure.

In at least one embodiment of the disclosure, in the case of a chamfer, a chamfer angle of between 25° and 65°, such as between 40° and 50°, and ca. 45° is formed. In other words, the chamfer runs at an angle of ca. 45° from an upper wall or side wall.

In at least one embodiment of the disclosure, a side length of the chamfer is able to be between 12 mm and 25 mm in the motor vehicle transverse direction and in the motor vehicle vertical direction. This means that ca. 12 mm to 25 mm of the upper wall are angled back by the chamfer, and 12 mm to 25 mm of the side wall or 12 mm to 25 mm of the lower wall.

In the case of a radius, the radius itself is between 12 mm and 25 mm.

The crash box itself has a wall thickness of between 0.5 mm and 4 mm, in particular of between 1 mm and 3 mm.

The remaining corners of the crash box, such as the internal corners of the crash box relative to the motor vehicle transverse direction, have no chamfer or no radius. No chamfer or no radius means that these corners have a radius or a chamfer which is smaller by at least 20%, by 33% and by at least 50% in relation to the external chamfer or the external radius. If a radius according to the disclosure were to be 20 mm on an external corner, for example, the radius of an internal corner would be less than 10 mm.

In at least one embodiment of the disclosure, only a front longitudinal portion of the crash box is able to have the chamfer or the radius in cross section. In other words, the chamfer or the radius do not have to cover the entire length of the crash box but are able to be configured only in the front longitudinal portion. This is the case with crash boxes which are not produced by extrusion, for example crash boxes formed from sheet metal shells, which are then joined to form a hollow component. In the case of extruded crash boxes, however, the front longitudinal portion also is able to be mechanically post-treated.

In any case, however, the longitudinal portion which has a chamfer or radius within the meaning of this disclosure might be shorter than a third of the crash box. In the event that the crash box has different lengths on the inside and outside, the shortest overall length of the crash box is used for interpreting the front longitudinal portion.

In at least one embodiment of the disclosure, a lower wall is configured to be lengthened. Parts of the side wall are also able to be configured to be lengthened. These parts of the side wall thus protrude over the rear wall of the cross member and thus engage below the cross member in the motor vehicle longitudinal direction. As a result, a longer crash box length is provided for energy absorption. In this case, therefore, the corner or chamfer is configured between the upper wall and side wall of the crash box according to the disclosure. With high or large vehicles, for example all-terrain vehicles, the reverse case also is also able to be provided and the upper wall of the crash box is configured to be lengthened and engages above the cross member. Accordingly, the chamfer or the radius is arranged in the corner between the side wall and the lower wall and the weld seam is correspondingly formed between the rear wall of the cross member and the crash box.

In at least one embodiment of the disclosure, a bead is configured in a front longitudinal portion on the crash box, such as on a side wall, thus an internal wall and/or an external wall. The bead is configured, for example, as a vertical bead, i.e. is the bead is configured on the side wall and runs with the longitudinal path of the bead in the motor vehicle vertical direction. In the event of a crash, a folding of the crash box or a buckling of the crash box is able to be improved by this bead. Instead of a vertical bead, two spaced-apart beads are able to be simply configured in the corners between the same side wall and the upper wall or lower wall.

The crash box itself is configured in cross section as a two-chamber or multi-chamber profile. In some variants, the crash box also is able to be coupled via a flange plate to the vehicle. Thus, in the case of radii or chamfers passing continuously over the entire length of the crash box in cross section is achieved at the attachment to the motor vehicle due to the attachment to the cross member.

The crash box itself is produced by an extruding method or by extrusion. The crash box is produced from an aluminum alloy. By the extruding method the crash box is able to be produced as an integral, one-piece hollow profile component made of a single material. The crash box is thus not produced as a shell component and also not as a roll-formed component which, for example, would require weld seams in the crash box itself, and this is avoided according to the disclosure by the extrusion component being produced in one piece and in a single material.

BRIEF DESCRIPTION OF THE DRAWINGS

Further advantages, features, properties and aspects of the present disclosure form the subject matter of the following description. Preferred variants are shown in the schematic figures. These figures serve for easier understanding of the disclosure. In the figures:

FIG. 2A to FIG. 2E show a longitudinal and cross sectional view of the bumper assembly in accordance with some embodiments, FIG. 3A to FIG. 3D show an alternative variant of the bumper assembly in accordance with some embodiments.

DETAILED DESCRIPTION

Figures 1A, 1B:
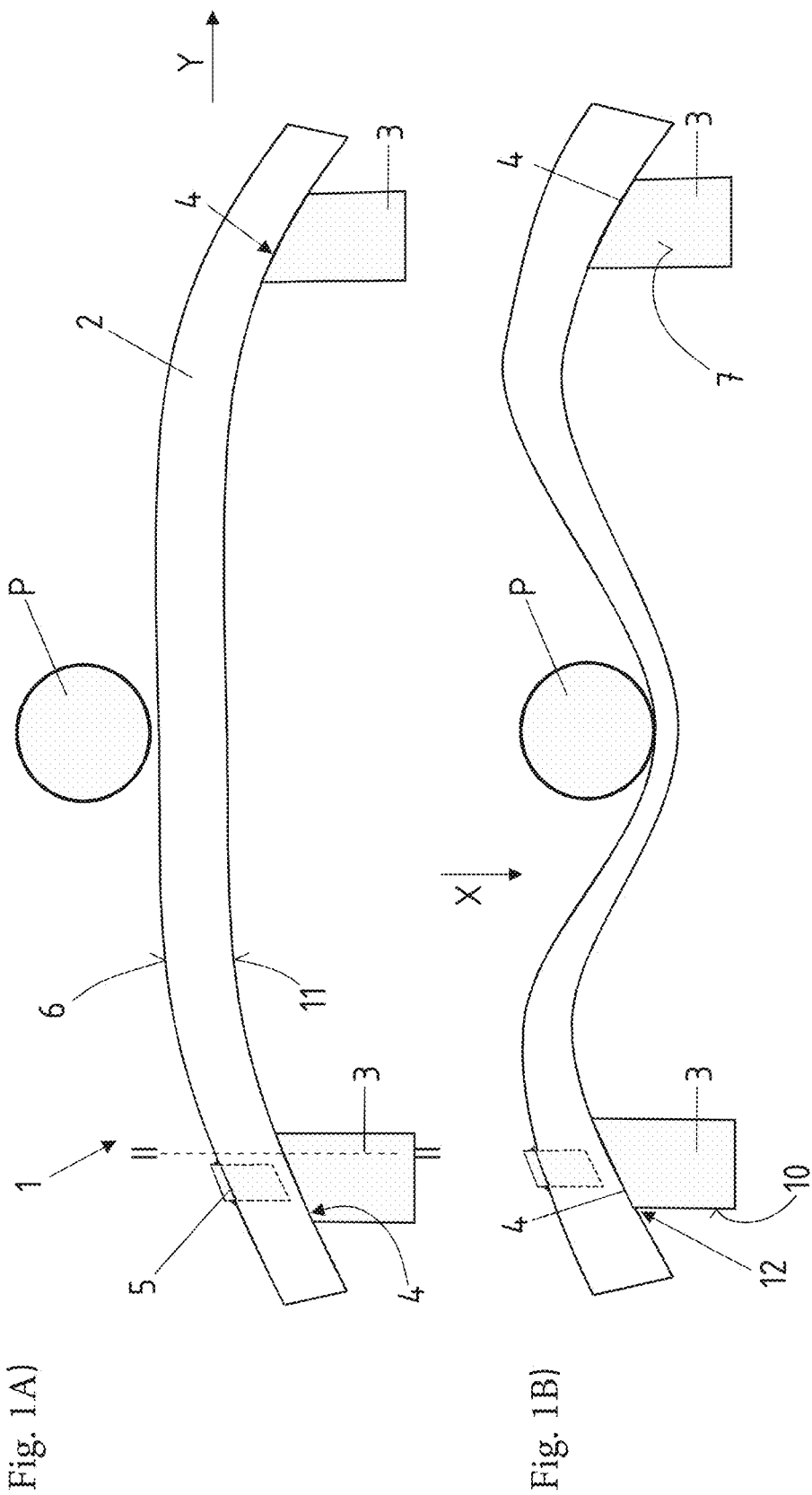
FIG. 1A and FIG. 1B show a plan view of a bumper assembly known from the prior art.

The same reference signs are used in the figures for the same or similar components, even if a repeated description is omitted for reasons of simplicity.

FIG. 1A and FIG. 1B show a bumper assembly 1 known from the prior art. The bumper assembly 1 has a cross member 2 which extends substantially in the motor vehicle transverse direction Y and the cross member 2 is fixed in each case on the end side via two crash boxes 3 to a motor vehicle, not shown in more detail. The crash boxes 3 have a coupling region 4 in which the crash boxes 3 are coupled to the cross member 2, such as by a welded connection. A towing eye 5 is shown. The towing eye 5 here is simply by way of example but also is able to be coupled to the rear wall 11, to the crash box 3 or to an additional flange plate.

If the motor vehicle now strikes a post P, which is shown, for example in a center pole test, the cross member 2 is deformed in the motor vehicle longitudinal direction X, which leads to a corresponding load in the respective coupling region 4, so that in an extreme case the coupling between the cross member 2 and the crash box 3 is detached or broken off.

FIG. 2A to FIG. 2E show a longitudinal or cross-sectional view of the bumper assembly 1. The longitudinal sectional view in FIG. 2A is shown along the cutting line II-II of FIG. 1A. The respective crash box 3 has an upper wall 7, a lower wall 8 and an internal side wall or internal wall 9 and an external side wall or external wall 10. The crash box 3 bears with its front face according to FIG. 2A against the rear wall 11 of the cross member 2 and is coupled here by a weld seam, not shown in more detail, at least substantially over the periphery, or entirely over the periphery.

In at least one embodiment of the disclosure, in the cross section of the crash box 3 one respective corner 12, 13 and, namely as shown here, both the corner 12 between the upper wall 7 and the external wall 10 and also the corner 13 between the lower wall 8 and the external wall 10, of the crash box 3 are configured to be rounded with a radius R. This is able to be implemented with a two-chamber hollow profile comprising a central web 14, as shown in FIG. 2B, but also in a three-chamber hollow profile comprising two central webs 14, as shown in FIG. 2C. The corner 12 is also shown by way of example in FIG. 1B and ensures that in the external region shown, relative to the motor vehicle transverse direction Y, high loads are not applied to the weld seam between the crash box 3 and the rear wall 11 of the cross member 2. This avoids the situation where the crash box is broken off. As shown in the cross-sectional views according to FIG. 2B to FIG. 2E, the profile has a substantially rectangular cross section. No additional outwardly oriented bulgings or roundings are shown. According to the disclosure, the chamfer 15 or the corners 12 or 13 are thus a connection which directly or immediately transitions between the upper wall 7 and the external wall 10 or the lower wall 8 and the external wall 10. An additional bulging or projection is avoided or is not provided according to the disclosure.

In FIG. 2D and FIG. 2E in each case a chamfer 15 is shown. The chamfer 15 has a chamfer angle of ca. 45°. The chamfer 15 has an extent or length 16 of 12 mm to 25 mm in the motor vehicle transverse direction Y. The chamfer 15 also has an extent or length 17 of also 12 mm to 25 mm in the motor vehicle vertical direction Z. It can also apply to all of the described variants that this corresponds to 15% to 30%, or 18% to 25%, of the crash box width (B).

The crash box 3 has a wall thickness W which is 1 mm to 3 mm.

The variant of FIG. 2D is configured here as a single-chamber hollow profile. The variant according to FIG. 2E is a three-chamber hollow profile. The chamfer 15 or the radius R preferably extends, as shown in FIG. 2A, over the entire length L of the crash box 3 in the motor vehicle longitudinal direction X. However, the chamfer can also be configured only in a front longitudinal portion Lv. The same applies to the radius R.

FIG. 3A to FIG. 3D show an alternative variant. Here according to FIG. 3B, FIG. 3C, and FIG. 3D and similar to FIG. 2A only an external corner 12, such as the upper external corner 12, according to the disclosure is able to be configured with a radius R or with a chamfer 15. Alternatively, however, as shown in FIG. 3A, the lower wall 8 of the crash box 3 and optionally parts of the side wall are able to engage below the cross member 2 in the motor vehicle longitudinal direction X. To this end, a longitudinal portion 18 of the lower wall 8 is configured to be longer and protrudes over the rear wall 11 of the cross member 2 in the motor vehicle longitudinal direction X.

An improved crash behavior is able to be produced by the protruding longitudinal portion 18 of the lower wall 8 of the crash box 3. More material is provided for dissipating crash energy in the motor vehicle longitudinal direction X. Stress peaks are avoided in the event of a crash by the upper, respectively external, corner 12 being configured according to the disclosure with the radius R or the chamfer 15. This also has an effect on a possible towing test, since here a load is present not only toward the front in the motor vehicle longitudinal direction X but also obliquely downwardly in the motor vehicle vertical direction Z, for example when a vehicle is tied down on a substrate for transporting. Here stress peaks are advantageously avoided by the respective external upper corner 12.

All of the views in FIG. 2A to FIG. 2E and FIG. 3A to FIG. 3D refer to the left-hand image plane in FIG. 1A and FIG. 1B. For the right-hand image plane and the crash box 3, which is present there, everything similarly applies mirror-symmetrically. Thus, the right-hand side wall relative to the image plane, or the external side wall of the crash box 3 is provided with the chamfer 15 or the radius R according to the disclosure.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A bumper assembly, comprising:
   a cross member coupled to a motor vehicle via crash boxes, wherein
   the cross member has a longitudinal direction,
   the cross member is oriented with the longitudinal direction along a transverse direction of the motor vehicle,
   the cross member has a rear wall which has attachment regions in which the crash boxes are coupled by a material connection to the cross member,
   in a cross section of the crash boxes which is parallel to the cross member, a chamfer or a radius is configured on each of the crash boxes in an external corner relative to the transverse direction of the motor vehicle, and
   in the cross section, the chamfer or the radius is configured only in a front longitudinal portion of the crash box.

2. The bumper assembly according to claim 1, wherein at least one of the cross member or the crash boxes is configured as an extruded component.

3. The bumper assembly according to claim 1, wherein the chamfer comprises a chamfer angle of between 25 and 65°.

4. The bumper assembly according to claim 1, wherein the radius is between 12 mm and 25 mm.

5. The bumper assembly according to claim 1, wherein a side length of the chamfer is between 12 mm and 25 mm in at least one of the transverse direction or in a vertical direction of the motor vehicle.

6. The bumper assembly according to claim 1,
   wherein the material connection comprises a weld seam coupling each of the crash boxes to the cross member,
   wherein the weld seam is configured on the rear wall of the cross member over at least 80% of a periphery of the rear wall.

7. The bumper assembly according to claim 6, wherein the weld seam is configured on the rear wall of the cross member over the entirety of the periphery of the rear wall.

8. The bumper assembly according to claim 6, wherein the weld seam is configured on the rear wall of the cross member over the periphery of the rear wall at least in a region of the chamfer or the radius.

9. The bumper assembly according to claim 1, wherein each of the crash boxes has a bead on at least one of an internal wall or an external wall, and the bead is arranged in the front longitudinal portion of the crash box.

10. The bumper assembly according to claim 1, wherein at least one of a lower wall or an upper wall of each of the crash boxes engages below the cross member in a longitudinal direction of the motor vehicle.

11. The bumper assembly according to claim 1, wherein the chamfer comprises a chamfer angle of between 4° and 50°.

12. The bumper assembly according to claim 1, wherein the chamfer comprises a chamfer angle of 45°.

13. The bumper assembly according to claim 1, wherein the front longitudinal portion is less than 60 mm.

14. The bumper assembly according to claim 1, wherein the front longitudinal portion is less than 30 mm.

15. The bumper assembly according to claim 1, wherein the front longitudinal portion is less than 10 mm.

* * * * *